(12) United States Patent
Yan et al.

(10) Patent No.: US 9,419,998 B1
(45) Date of Patent: *Aug. 16, 2016

(54) FILTERING HIDDEN DATA EMBEDDED IN MEDIA FILES (71) Applicant: Fortinet, Inc., Sunnyvale, CA (US)

(72) Inventors: Guoyi Yan, Foster City, CA (US); Juneng Zheng, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,879

(22) Filed: Apr. 19, 2016

Related U.S. Application Data (63) Continuation of application No. 14/266,762, filed on Apr. 30, 2014, now Pat. No. 9,319,384.

(51) Int. Cl.
*H04L 29/06* (2006.01)
*H04N 1/32* (2006.01)

(52) U.S. Cl.
CPC .......... *H04L 63/145* (2013.01); *H04L 63/1425* (2013.01); *H04L 63/20* (2013.01); *H04N 1/32352* (2013.01)

(58) Field of Classification Search
CPC ... H04L 9/3247; H04L 9/0869; H04L 9/0894; H04L 9/12; H04L 63/0428; H04L 63/062
See application file for complete search history.

(56) References Cited

U.S. PATENT DOCUMENTS

| 8,789,174 B1 | 7/2014 | Gupta |
| 9,319,384 B2 | 4/2016 | Yan et al. |
| 2003/0149890 A1 | 8/2003 | Shen |
| 2005/0234875 A1 | 10/2005 | Auerbach |
| 2008/0310629 A1 | 12/2008 | Van Der Veen |
| 2013/0311776 A1 | 11/2013 | Besehanic |
| 2013/0311780 A1 | 11/2013 | Besehanic |
| 2015/0319138 A1 | 11/2015 | Yan et al. |

OTHER PUBLICATIONS

Non-Final Rejection for U.S. Appl. No. 14/266,762 mailed Nov. 6, 2015.
Notice of Allowance for U.S. Appl. No. 14/266,762 mailed Mar. 11, 2016.

*Primary Examiner* — Amir Mehrmanesh
(74) *Attorney, Agent, or Firm* — Hamilton, DeSanctis & Cha LLP (57) ABSTRACT

Systems and methods for filtering unsafe content at a network security appliance are provided. According to one embodiment, a network security appliance captures network traffic and extracts a media file from the network traffic. The network security appliance then determines the presence of a hidden data item embedded in the media file in a machine-readable form. When such a hidden data item is identified, the network security appliance performs one or more actions on the media file based on a predefined security policy.

16 Claims, 6 Drawing Sheets

FIG. 6

FILTERING HIDDEN DATA EMBEDDED IN MEDIA FILES

CROSS-REFERENCE TO RELATED APPLICATIONS

This application is a continuation of U.S. patent application Ser. No. 14/266,762, filed Apr. 30, 2014, now U.S. Pat. No. 9,319,384, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2016, Fortinet, Inc.

BACKGROUND

1. Field

Embodiments of the present invention generally relate to the field of network security techniques. In particular, various embodiments relate to hidden data identification and methods for filtering media files that are embedded with malware, spam or sensitive information.

2. Description of the Related Art

A barcode is an optical machine-readable representation of data. Linear or one-dimensional (1D) barcodes represent data by varying the width of and spacing between parallel lines or rectangles. Two dimensions (2D) barcodes use dots, hexagons and other geometric patterns to represent data. A unit of a 2D barcode, such as a matrix barcode or Quick Response (QR) code, may represent more than 1K bytes of data depending upon the version and encoding employed. A QR code that encodes text, music, images, Uniform Resource Locators (URLs) and/or emails can be generated as an image file and transmitted through short message service (SMS) and/or multimedia messaging service (MMS) or via the Internet. Barcode reader utility software running on a computing device, such as a smart phone, may scan a barcode by a camera connected to or integrated within the computing device. The barcode reader decodes the encoded content and then may show the content.

Some barcode reader utility software may carry out further operations based on the type of encoded content. For example, when the encoded content includes or represents a URL, the barcode reader utility software may launch a web browser and open the URL directly (via URL redirection, for example, which allows QR codes to send metadata to existing applications on the device running the barcode reader utility software). It is convenient for a smart phone user to open a web page by scanning a barcode instead of typing in the URL manually. As such, QR codes have become more prevalent as part of product/service advertising strategies targeting mobile-phone users via mobile tagging. Personal information or business cards may also be encoded within 2D barcodes (e.g., QR codes) and can be printed out or transmitted through a network.

Other ways to embed hidden content in media files include digital watermarking and steganography. Digital watermarking is a kind of marker covertly embedded in a noise-tolerant signal such as audio or image data. Digital watermarks are only perceptible under certain conditions, i.e., after using some algorithm, and are otherwise imperceptible to human senses. Both steganography and digital watermarking employ steganographic techniques to embed data covertly in noisy signals but remain imperceptible to human senses. Digital watermarks may be used to verify the authenticity or integrity of the carrier signal or to show the identity of its owner. It is prominently used for tracing copyright infringements and for banknote authentication.

As media files may carry encoded and hidden data that are imperceptible to human senses, some malware use these techniques to intrude into user devices or transfer sensitive information. For example, a malicious web site may distribute a barcode that contains its URL to smart phone users and induce the users to scan or decode the barcode. After the smart phone decodes the barcode, the smart phone may launch its web browser and open the malicious website. The website may contain malware that can, among other things, gain access and/or control of the smart phone, disrupt operation of the smart phone and/or gather sensitive information stored on or entered into the smart phone (e.g., usernames and passwords entered into apps and/or websites).

In view of the foregoing, there exists a need for methods and system that can resist the spread of media files containing malware or sensitive information embedded therein in human imperceptible form.

SUMMARY

Systems and methods for filtering unsafe content at a network appliance are provided. According to one embodiment, a network security appliance (e.g., a firewall) captures network traffic exchanged between a sender and a recipient and extracts a media file from the network traffic. The network security appliance then determines the presence of a hidden data item embedded in the media file in a machine-readable form. When such a hidden data item is identified, the network security appliance performs one or more actions on the media file based on a predefined security policy.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods for filtering unsafe content at a network appliance are provided. According to one embodiment, a network appliance captures network traffic and extracts a media file from the network traffic. The network appliance then determines if a hidden data item is embedded in the media file in a machine-readable form. The hidden data item may be a barcode, a digital watermark or other steganographic data containing encoded data that is imperceptible to human senses. The network security appliance takes appropriate action on the media file when such a hidden data item is found in the network traffic.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

As used herein, the term "hidden" generally refers to something that is imperceptible to human senses. Examples of hidden data items or content include, but are not limited to, data encoded within digital watermarks, steganography, 1D barcodes and/or 2D barcodes. While 1D and 2D barcodes are perceptible by the human sense of vision, the encoded content embedded therein is not perceptible by human senses and requires the assistance of decoding software. As such, as used herein "hidden data items" and "hidden content" include data (e.g., numeric alphanumeric, binary and/or kanji data) encoded within digital watermarks, steganography, 1D barcodes, 2D barcodes and/or other optical labels or representations of data.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "media file" generally refers to a file containing image, audio and/or video data.

The phrase "network security appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Figure 1:
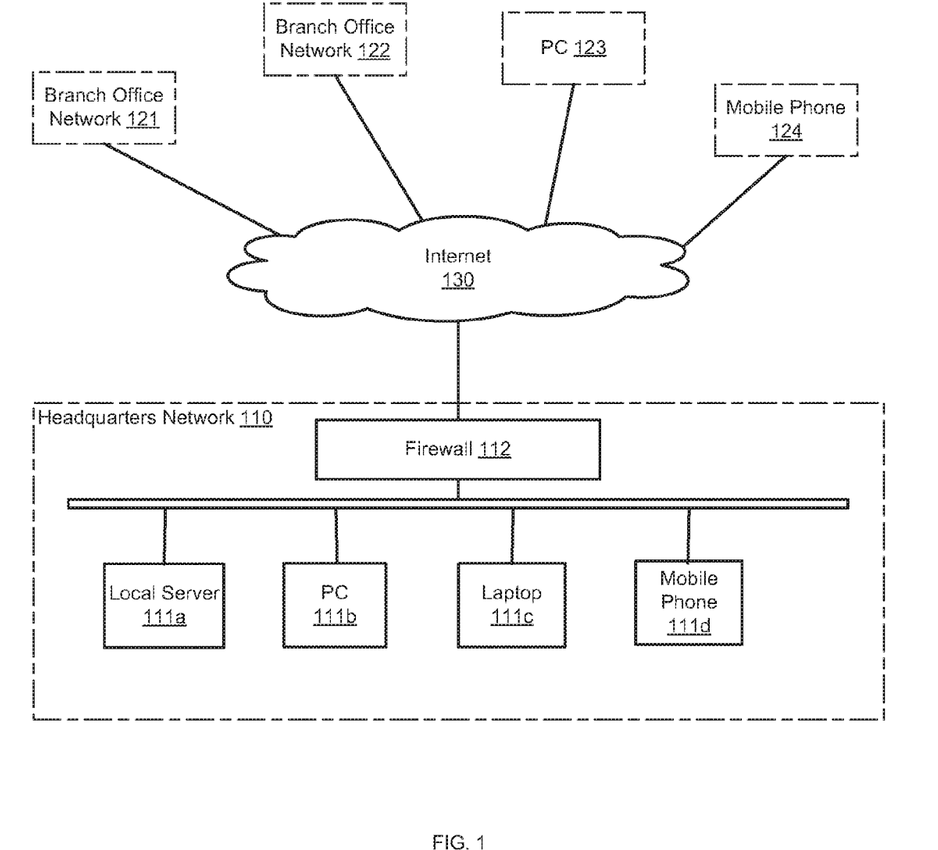
FIG. 1 illustrates an exemplary network architecture in accordance with an embodiment of the present invention.

FIG. 1 illustrates an exemplary network architecture in accordance with an embodiment of the present invention. Network architecture 100 shown in FIG. 1 comprises a headquarters network 110, multiple branch office networks 121 and 122. The headquarters network 110 and branch office networks 121 and 122, PC 123 and mobile phone 124 are connected through internetworks, such as the Internet 130. Headquarters network 110 comprises multiple network appliances, such as local server 111a, PC 111b, laptop 111c, mobile phone 111d and other computing devices that are operatively coupled to each other through a Local Area Network (LAN), wherein the LAN is then operatively coupled with firewall 112 (or one or more other network security appliances) that enable access to Internet 130. Firewall 112 separates the external computing environment, represented by Internet 130, from the internal computing environment of headquarters network 110. Firewall 112 may intercept or otherwise filter the communication between Internet 130 and the network appliances of headquarters network 110 and scan for malware, viruses or other high-risk network access. The internal structures of branch office networks 121 and 122 are omitted as they may be the same as that of headquarters network 110.

In the exemplary network architecture shown in FIG. 1, firewall 112 may be a rule-based security device that controls traffic going through its interfaces. Usually, firewall 112 may comprise multiple physical network interfaces, such as an internal interface with 4-24 or more Ethernet ports, 1-4 or more wide area network (WAN) interfaces, one demilitarized zone (DMZ) interface. Further, when the private network is separated into multiple virtual LANs (VLANs), firewall 112 may also define multiple virtual interfaces for each VLAN. Firewall 112 comprises a rule set that includes multiple rules that are created by the network administrator and controls the traffic passing through firewall 112. In each rule, the traffic is identified by source interfaces, destination interfaces, source Internet Protocol (IP) addresses, destination IP addresses, users/user groups, devices and/or other parameters of the traffic. In one embodiment of the present invention, multiple interfaces of firewall 112 may be selected as the source/destination of traffic in a single rule. The multiple interfaces may include physical interfaces, virtual interfaces and/or zones of firewall 112. Usually, multiple interfaces that belong to the same category may be selected as a source in a rule. For example, multiple VLAN interfaces may be selected as sources/destinations of the traffic in a rule. However, different categories of interfaces may be also allowed as sources/destinations of a traffic flow in a rule. For example, an internal interface and a WAN interface or a physical interface and a virtual interface may be selected in a rule as the sources/destinations of traffic. In this scenario, a warning message may be provided to the network administrator before the rule containing multiple categories of interfaces can be configured within firewall 112. After the traffic flow is defined, an action controlling the traffic flow, such as accept or deny, is designated in each rule. In operation, all traffic going through interfaces of firewall 112 is captured by firewall 112. The source interface, destination interface and other parameters of the captured traffic flow are matched with those of each rule of a rule set. The first matched rule in the rule set is typically used for controlling the traffic flow and the traffic flow is processed based on the action defined in the matched rule.

Figure 2:
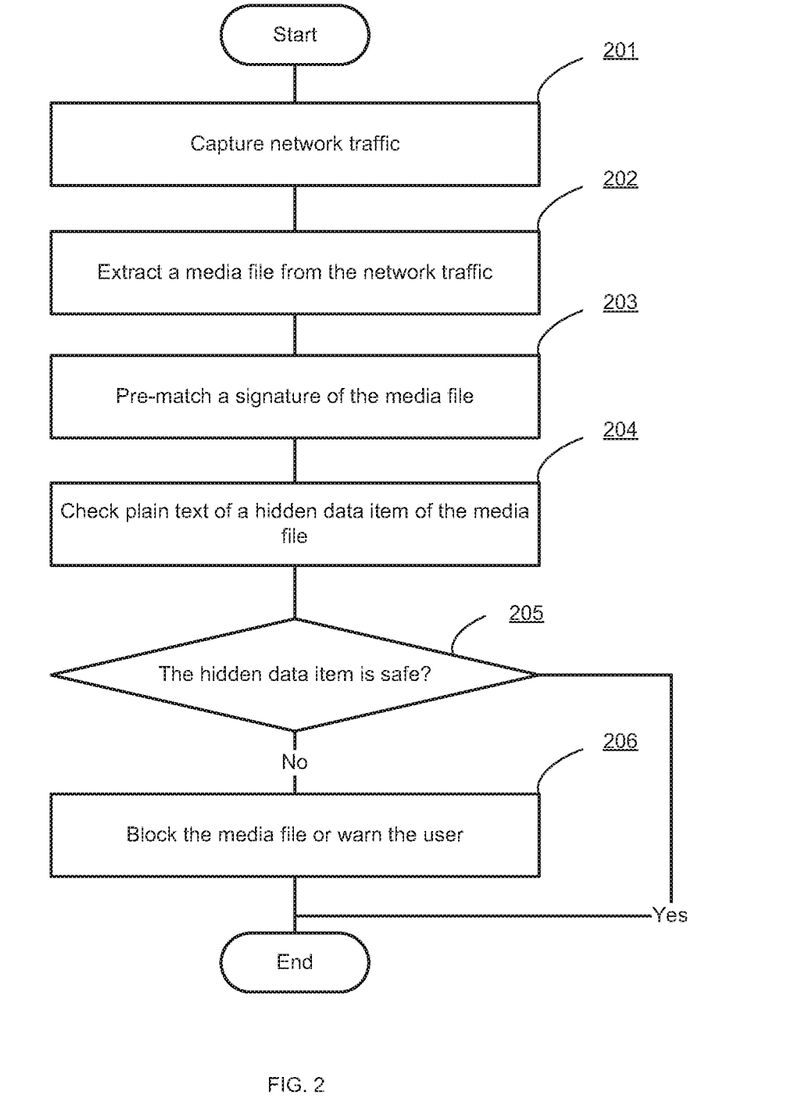
FIG. 2 is a flow diagram illustrating a method for scanning a media file containing human imperceptible content at a security device in accordance with an embodiment of the present invention.

FIG. 2 is a flow diagram illustrating a method for scanning a media file containing imperceptible content at a security device in accordance with an embodiment of the present invention. In the present embodiment, a media file that is transmitted from a sender to an intended recipient is captured by a network security appliance, which is usually disposed at a border of a private network. The media file may be an image file, an audio file or a video file. The media file may contain an image representing a barcode or an embedded digital watermark that is imperceptible to human senses. In the following example it is assumed the media file is a barcode image that contains a malware URL (e.g., a URL suspected or confirmed to be associated with malicious activities and included on a URL blacklist).

At block 201, a network security appliance (e.g., firewall 112) captures network traffic (e.g., data packets) between senders and intended recipients. The network traffic may be incoming traffic or outgoing traffic of a private network.

At block 202, a media file is extracted from the network traffic by the network security appliance. Usually, data packets of the network traffic are cached and then the media file may be reconstructed from the cached data packets.

At block 203, after the media file is extracted, it is sent to an inspection engine to search for any unsafe information based on security policies of the network security appliance. The inspection engine may be responsible for carrying out antivirus protection, email filtering (antispam), web filtering, data leak prevention and the like. In context of the present example, the inspection engine may determine the media file at issue that includes embedded therein one or more hidden data items is unsafe without actually decoding the hidden data items. To determine whether the media file contains unsafe data items embedded therein, the inspection engine may match the media file with known unsafe media files that are collected by the network security appliance. The network security appliance may maintain an image database that collects known unsafe media files. The unsafe images may be collected from different sources. First, the network security appliance may maintain a list of malicious or unsafe URLs. The QR code or other barcode images of the malicious or unsafe URLs may be generated and stored in an unsafe media file database by the network security appliance. Second, after the network security appliance intercepts a media file that contains unsafe hidden data, the media file and/or a signature thereof may be stored in the unsafe media file database for future use. Third, suspicious media files with hidden data items may be submitted to the network security appliance by other users. The suspicious media files may be decoded and scanned for one or more hidden data items by the network security appliance and may be stored to the unsafe media files database if one or more hidden data items are found and determined to be unsafe. The suspicious media files database may be stored locally at the network security appliance or remotely at other servers or in cloud storage, which may be shared by multiple network security appliances for performing hidden data inspection.

In one embodiment, a received image file may compared directly with the known unsafe images stored by the network security appliance. Various algorithms for matching/comparing images are well known in the art. For example, keypoint matching, the histogram method, a pixel-based identical check and/or a block-based identical check may be used to match the received image file with images in the database. If the received image file matches a known unsafe image within a predetermined or configurable degree of certainty, it is determined that an unsafe hidden data item exists in the image file. In another embodiment, a signature of the received media file may be generated and matched with signatures of the unknown unsafe media files as described further below with reference to FIG. 3.

At block 204, the received media file is decoded and a hidden data item may be extracted. The network security appliance may scan the decoded hidden data item for any malware, unsafe URLs, sensitive information and/or unlawful content. The hidden data item may be inspected based on security policies as described further below with reference to FIG. 4.

At block 205, based on the results of the inspections of blocks 203 and 204, the inspection engine determines whether the media file is safe. In the context of the present example, both the pre-match inspection of block 203 and the inspection after decoding of block 204 are employed. In alternative embodiments, either of the two inspection methodologies described above may be used independently or in combination with other inspection methodologies for scanning for unsafe hidden data items in media files.

At block 206, the network security appliance may block transmission of the media file to the intended recipient. Optionally, a warning message indicating that an unsafe hidden data item has been found may be sent to the network administrator or the intended recipient.

Figure 3:
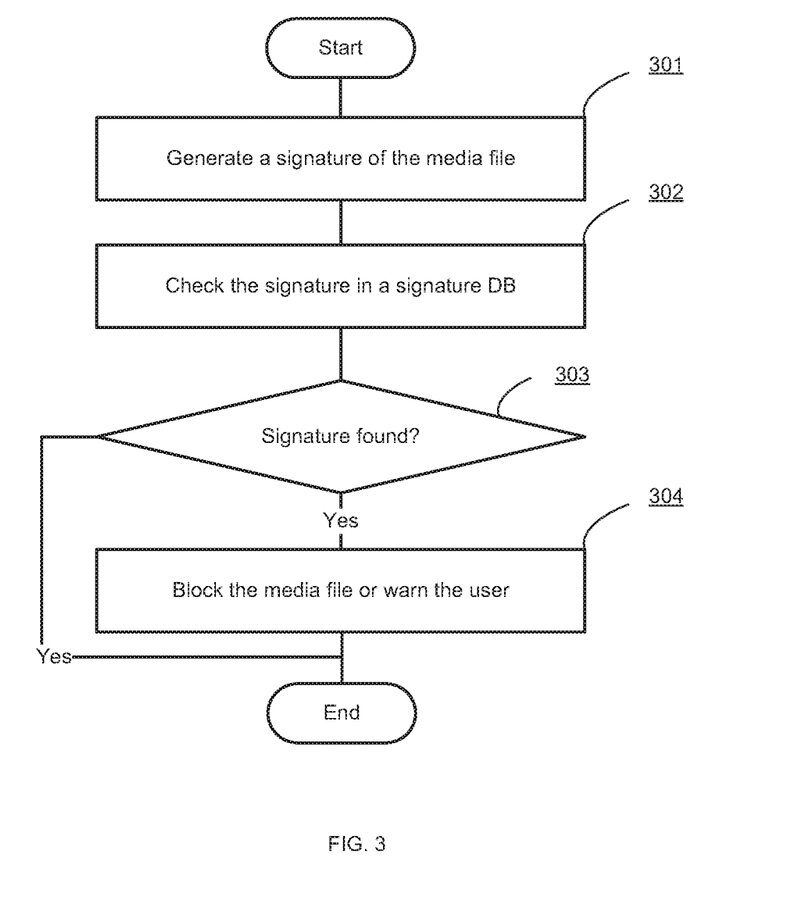
FIG. 3 is a flow diagram illustrating a method for checking human imperceptible content by comparing a signature of a media file in accordance with an embodiment of the present invention.

FIG. 3 is a flow diagram illustrating a method for checking human imperceptible content by comparing a signature of a media file in accordance with an embodiment of the present invention. In the present embodiment, the media file is checked for an unsafe hidden data item without decoding the human imperceptible content. When decoding of the human imperceptible content of the media file is too time-consuming, the media file may be filtered by inspecting its signature before it is decoded for further inspection.

At block 301, a signature of the received media file may be generated by a network security appliance (e.g., firewall 112). The signature may be a cryptographic hash value, such as a Message Digest 5 (MD5) value or a Secure Hash Algorithm (SHA) value. The hash value may also be an average or perceptual hash value that is derived from various features of the content of the media file.

At block 302, the network security appliance may check the signature of the media file against a signature database that contains signatures of known unsafe media files. Depending upon the particular implementation, the signature database may also or alternatively include signatures of known safe media files. As mentioned in the embodiment shown by FIG. 2, the network security appliance may maintain an unsafe media file database. The network security appliance may generate signatures of the unsafe media files and store the signatures in the database for future inspection. In some embodiments, checking the signature of the media file in a signature database may be conducted by a hardware-based content processor that supports signature-based patterns. The hardware-based content processor may match the signature of the media file with multiple (e.g., over 30,000) signatures in the database simultaneously, by utilizing hardware-friendly blooming filters and hash functions. The hardware-based content processor may speed up the whole system significantly.

At block 303, the network security appliance may determine if the signature of the received media file has been found in the signature database. If the signature is found in a signature database containing signatures of only known unsafe media files, then the received media file is a known unsafe file that contains a hidden data item.

An appropriate action is then taken based on the security policy. For example, the media file may be blocked or a warning message may be sent to the intended recipient or the network administrator at block 304. If an average hash value or perceptual hash value is used, then if the signature of the media file is near enough to a signature of a known unsafe media file, the media file may be determined to be the known unsafe media file with some variations and may be blocked by the network security appliance.

Figure 4:
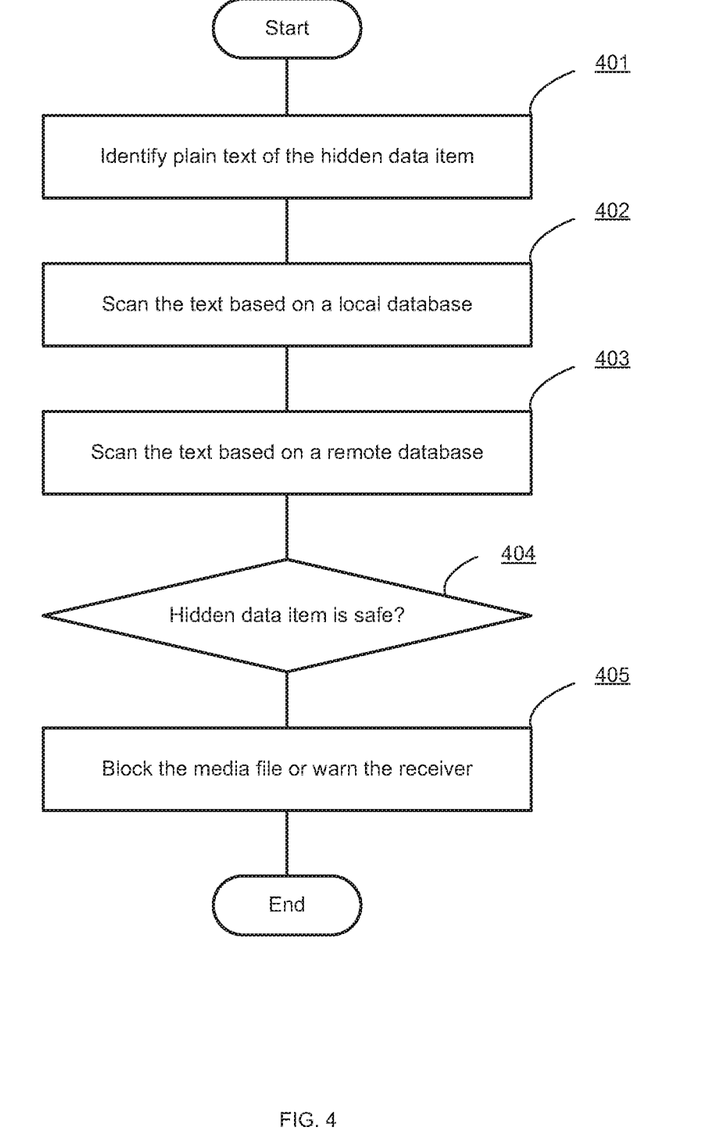
FIG. 4 is a flow diagram illustrating a method for checking human imperceptible content by decoding the human imperceptible content in accordance with an embodiment of the present invention.

FIG. 4 is a flow diagram illustrating a method for checking human imperceptible content by decoding the human imperceptible content in accordance with an embodiment of the present invention. The embodiment shown in FIG. 3 can identify an unsafe media file when the same media file has been found before. It is possible that an unsafe image file may be changed sufficiently so as not to be identified by comparison with previously observed known unsafe image files. In the present embodiment, the human imperceptible content embedded in the received media file is decoded so that the human imperceptible content may be evaluated.

At block 401, the received media file is sent to a decode module of the inspection engine. The decode module may detect the type of the media file and call a corresponding decoding function to obtain the human imperceptible contents. For example, if the media file is an image file, it may be sent to a barcode decoder to read out the encoded data. The barcode decoder may support multiple image formats, including, but not limited to, as Portable Network Graphics (PNG), Joint Photographic Experts Group (JPEG), JPEG 2000, Exchangeable image file format (Exif), raw image format (RAW), Graphics Interchange Format (GIF), Tagged Image File Format (TIFF) and Windows Bitmap image file format (BMP). The barcode decoder may read out barcode in various barcode formats, including, but not limited to, Universal Product Code (UPC)-A, UPC-E, International Article Number (EAN)-8, EAN-13, Code 39, Code 128, QR Code, Data Matrix, PDF417, Interleaved 2 of 5 (ITF) and IFT-14. The image file may also be sent to a watermark decoder to read out one or more image watermarks. Similarly, audio or video files may be sent to corresponding decoders to read out one or more audio/video watermarks.

At block 402, if a hidden data item is identified by the decoder, the hidden item is scanned locally based at least on one or more security policies of the network security appliance. For example, if a security policy is a web filter that blocks a website, then the decoded hidden data is scanned to check if the hidden data includes a URL associated with or redirecting to a blocked website. If a security policy is a sensitive information (e.g., social security numbers, credit card numbers, etc.) filter, the decoded hidden data is scanned for such sensitive information. If a keyword filter is configured in the network security appliance, the decoded data may be scanned for designated keywords. Other policies that monitor the transmission of watermarks or steganographic data may be configured so that media files that are embedded with watermarks or steganographic data may be blocked from transmission. It will be apparent to one of ordinary skill in the art that the decoded data may be checked by one or more of an Intrusion Prevention System (IPS) engine for antivirus protection, email filtering (antispam), web filtering and data leak prevention.

At block 403, the media file may be sent to a remote or cloud-based network security appliance for further deep inspection. Usually, a local virus or spam signature database contains only a part of all known virus or spam signatures, so that the scanning may be carried out quickly. Local signature databases may also fail to be updated in a timely manner. Therefore, if no threat is found by the local network security appliance, the media file or its signature may be sent to a remote or cloud-based network security appliance for further evaluation. Alternatively or additionally, if the local network security appliance is unable to decode the media file, the media file may be decoded by a more powerful decoder and a deeper inspection into the decoded hidden data may be performed by a remote network security appliance.

At block 404, the network security appliance determines if the hidden data is safe based on the inspections of blocks 402 and 403.

At block 405, the media file is blocked from transmission or a warning message may be sent to the intended recipient or the network administrator if the hidden data is not safe.

Figure 5:
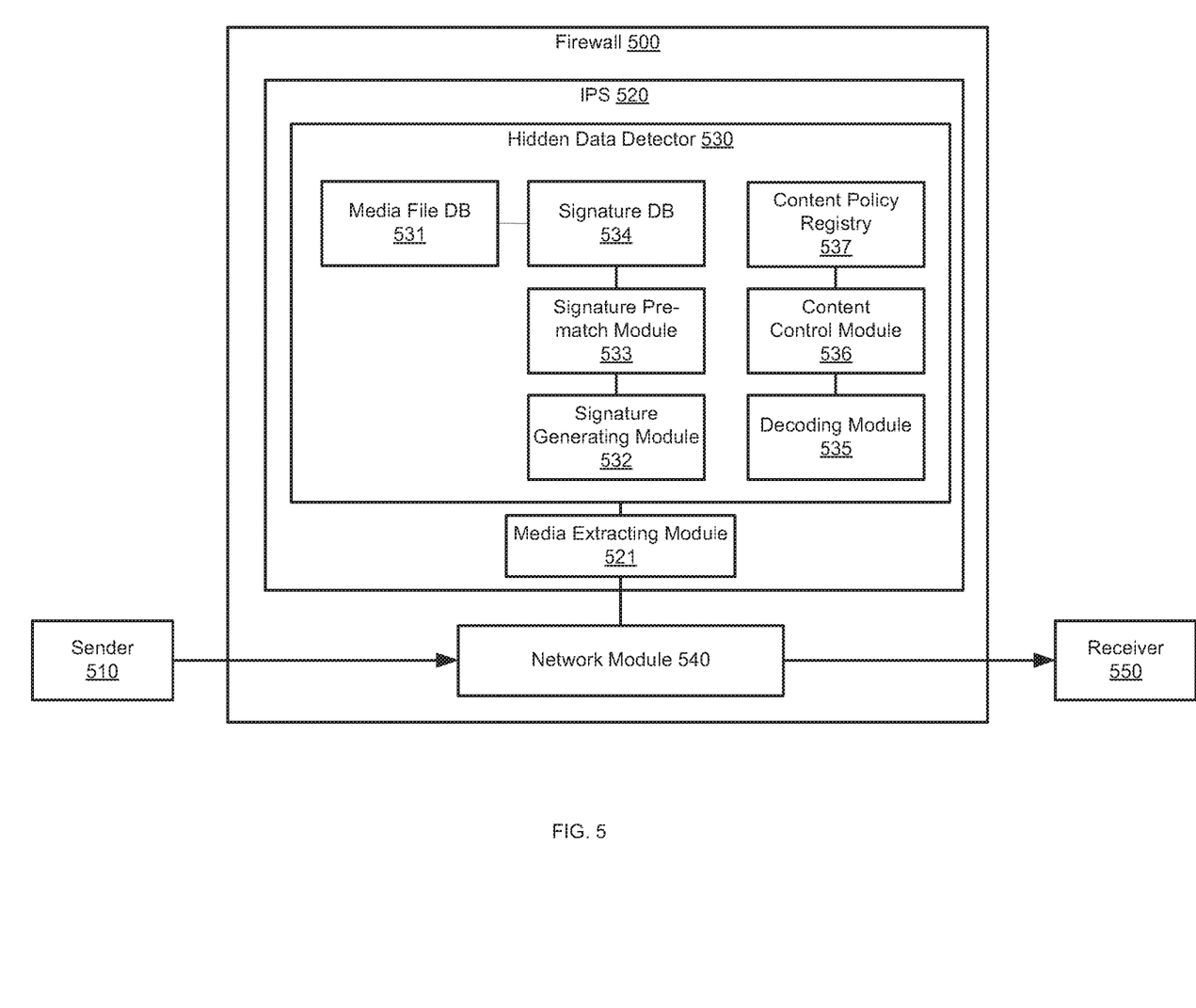
FIG. 5 illustrates exemplary functional units of a security device in accordance with an embodiment of the present invention.

FIG. 5 illustrates exemplary functional units of a network security appliance in accordance with an embodiment of the present invention. In the present embodiment, a network system comprises a sender 510, a firewall 500 and a receiver (intended recipient) 550. Network traffic from sender 510 to receiver 550 is captured by firewall 500. Firewall 500 comprises a network module 540 and an IPS 520. Network module 540 is used for capturing data packets between sender 510 and receiver 550. After data packets are captured, IPS 520 may scan them based on security policies of firewall 500. If the data packets violate any security policy, they may be blocked by firewall 500.

In the present embodiment, IPS 520 comprises a media extracting module 521 and a hidden data detector 530. The data packets captured by network module 540 may be cached by media extracting module 521. A media file that is sent from sender 510 may be reconstructed from the cached data packets. After the media file is extracted, hidden data detector 530 may scan it based on security policies of firewall 500.

Hidden data detector 530 is used for detecting if the media file contains any hidden data item that should be blocked based on different algorithms. Hidden data detector 530 may comprise multiple functional modules that may check hidden data item in the media file with or without decoding the hidden data item contained within the media file. Hidden data detector 530 may comprise a media file database 531, a signature generating module 532, a signature matching module 533 and a signature DB 534, which scans the media file based on a signature matching algorithm without decoding the hidden data item from the media file. Hidden data detector 530 may further comprise a decoding module 535, a content control module 536 and a content policy registry 537 that scans the media file by decoding a hidden data item contained within the media file. It will be appreciated by one of ordinary skill in the art will appreciate that any or all of the scanning algorithms described herein and/or other image matching techniques may be used for determining if a hidden data item is embedded in media file and if the media file is safe or not. The functional modules for the hidden data item scanning are described in detail below.

Media file DB 531 comprises known unsafe media files that are collected by firewall 500. These unsafe media files contain hidden content embedded within the media files. The hidden content may be encoded as barcodes or digital watermarks that are imperceptible by human senses. URLs that direct a user device to access an unsafe website or carry out unsafe operations may be encoded and hidden in the media files. Sensitive information, such as personal information, that is encoded within a QR code may be embedded in an image file and transmitted without permission by the owners. The hidden content may also comprise digital watermarks that identify the existence of proprietary information, intellectual property rights and/or the owner of the media file. The unsafe media files may be intercepted by the firewall or submitted by other users for inspection.

Signature DB 534 comprises signatures or fingerprints of unsafe media files that are known to the firewall 500. A signature or fingerprint may be a cryptographic hash value, including, but not limited to a Message Digest 5 (MD5) value or a Secure Hash Algorithm (SHA) value of a known unsafe media file. Optionally, the signature or fingerprint may be an average hash value or a perceptual hash value that is derived from various features of the content of the media file. The signature or fingerprint may be other fingerprints that are comparable with image matching algorithms. In the present embodiment, a signature or fingerprint of each media file in the image DB 532 may be generated by signature generating module 532 and stored in signature DB 534. Signature DB 534 may also be downloaded from a server that collects signatures of unsafe media files.

It will be appreciated by one of ordinary skill in the art that media file DB 531 and signature DB 534 may be stored locally at firewall 500 so that the searching for known unsafe media files may be conducted quickly. Optionally, media file DB 531 and signature DB 534 may be stored remotely from firewall 500. These databases may be maintained by and shared among multiple firewalls so that more unsafe media files may be identified.

Signature generating module 532 is used for generating a signature or fingerprint for the media file that is extracted by media extracting module 521. The signature may be a cryptographic hash value, e.g., MD5 or SHA value, of the extracted media file. By comparing the cryptographic hash value of the present media file with hash values of known unsafe media files, hidden data detector 530 may determine if the same media file has been identified as an unsafe file before. However, it is possible that the received media file and a known unsafe media file in media file DB 531 contain the same unsafe hidden content, but the files are not identical. For example, the received media file and a known unsafe media file have the same content but saved in different format or the received media file may have been generated by scaling, distorting or other modification of the known unsafe image file. In these cases, cryptographic hash values of the received media file and the known unsafe media file will not match, but average or perceptual hash values may be used to find the degree of similarity of two images. If the average or perceptual hash value of the received media file is the same as or similar to the perceptual hash value of a known unsafe file, the received file may also be identified as an unsafe file.

Signature matching module 533 is used for searching the signature or fingerprint of the received media file in signature DB 534. If the signature is found or matched with a signature in the signature DB 534, the media file is identified as unsafe and IPS 520 may inform network module 540 to block the media file from transmission to receiver 550 and may send a warning message to receiver 550 or network administrator.

If a signature of the received media file is not found in signature DB 534, the media file may be sent to decoding module 535 so that the hidden data item of the media file may be decoded. Decoding module 535 may be a barcode reader supporting multiple barcode formats, such as UPC-A, UPC-E, EAN-8, EAN-13, Code 39, Code 128, QR Code, Data Matrix, PDF 417 and ITF. Decoding module 535 may be a digital watermark identifier. By scanning the media file, one or more digital watermarks that are encoded in the media file may be identified by decoding module 535. The digital watermark may be special text, audio or logo embedded by an IP right owner of the media file. The watermark may also include sensitive information or illegal content embedded by someone who wants to hide such content from firewall checking.

After the hidden data item is decoded from the media file, content control module 536 scans the hidden data item based on corresponding scan policies in content policy registry 537. In one embodiment, if the hidden data is a URL and a website filter is configured in content policy registry 537, content control module 536 scans the URL based on the website filter. If the URL is not allowable, the media file is blocked. In another embodiment, if the hidden data contains text and a keyword filter or sensitive information filter is configured, the text is scanned based on the filters. When a forbidden keyword or sensitive information is detected by content control module 536, the media file may be blocked. Content control module 536 may also check the digital watermarks decoded from the media file based on corresponding security policies.

Further, after the hidden data in a media file is decoded and identified as unsafe based on a security policy, the media file may be stored in media file DB 531 and the signature thereof may be stored in signature DB 534 for use in connection with future pre-match signature scanning.

Figure 6:
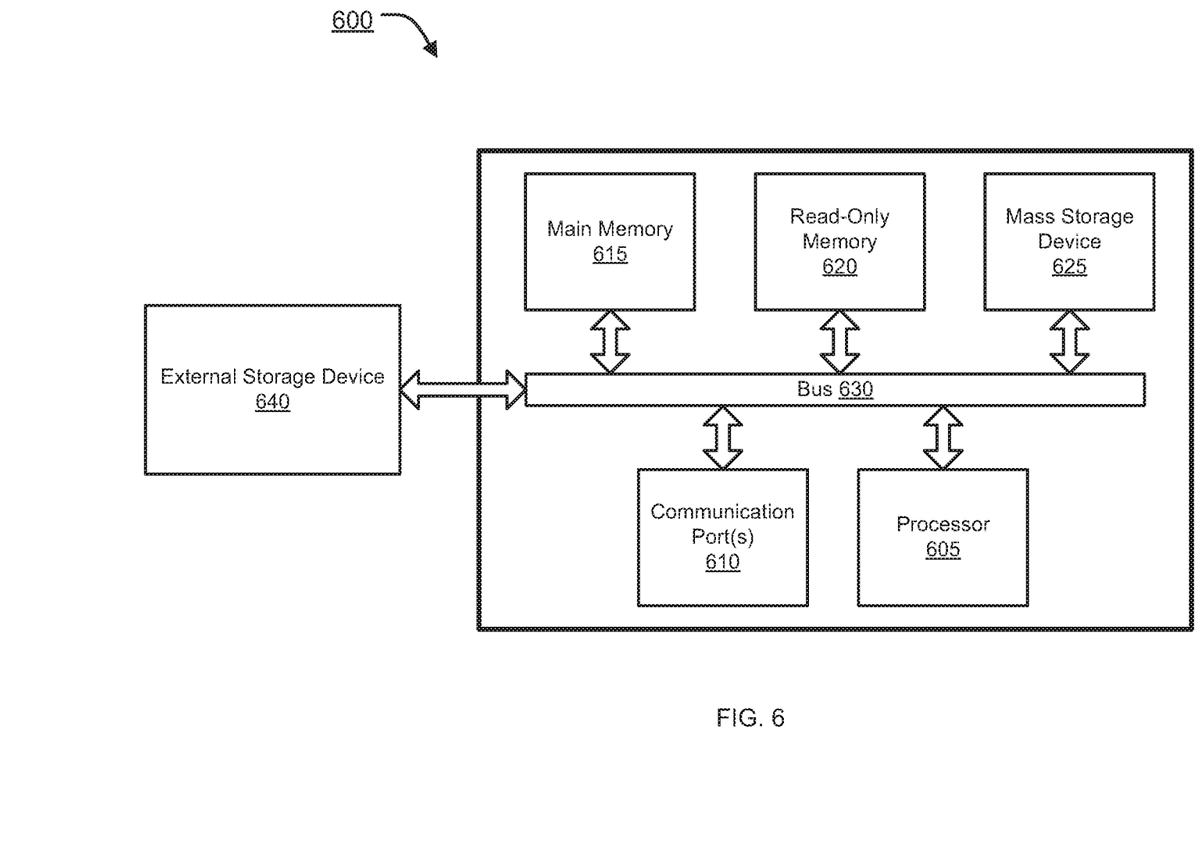
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:
1. A method comprising:
 capturing network traffic by a network security appliance associated with a protected network, wherein the network traffic is originated by a source external to the protected network and is directed to an intended recipient associated with the protected network;

extracting, by the network security appliance, a media file from the network traffic;

determining, by the network security appliance, presence of a potentially malicious hidden data item embedded in the media file in a form of encoded data within one or more of a digital watermark, steganography and a barcode by decoding the encoded data by a decoding module of the network security appliance;

determining whether the decoded data violates one or more security policies of a plurality of security policies of the network appliance by applying a Uniform Resource Locator (URL) filter to the decoded data by a content inspection engine of the network security appliance; and when said determining whether the decoded data violates one or more security policies is affirmative, then protecting the intended recipient against the potentially malicious hidden data item by the network security appliance performing one or more of (i) blocking transmission of the media file to the intended recipient, (ii) causing the intended recipient to be alerted regarding the potentially malicious hidden data item and (iii) causing a network administrator of the protected network to be alerted regarding the potentially malicious hidden data item.

2. The method of claim 1, wherein said determining presence of a potentially malicious hidden data item comprises matching a signature of the media file against a plurality of signatures of media files known to include unsafe hidden data.

3. The method of claim 1, wherein the plurality of security policies includes a security policy containing information indicative of a URL known to be associated with malicious activities.

4. The method of claim 1, wherein the plurality of security policies includes a security policy containing information indicative of a URL associated with a blocked website.

5. The method of claim 1, wherein the plurality of security policies includes a security policy containing information indicative of a URL that redirects to a blocked website.

6. The method of claim 1, wherein the media file comprises an image file.

7. The method of claim 1, wherein the media file comprises a video file.

8. The method of claim 1, wherein the barcode comprises a linear barcode or a matrix barcode.

9. A network security appliance comprising:

a non-transitory storage device having embodied therein instructions representing a security application; and one or more processors coupled to the non-transitory storage device and operable to execute the security application to perform a method comprising:

capturing network traffic associated with a protected network protected by the network security appliance, wherein the network traffic is originated by a source external to the protected network and is directed to an intended recipient associated with the protected network;

extracting a media file from the network traffic;

determining presence of a potentially malicious hidden data item embedded in the media file in a form of encoded data within one or more of a digital watermark, steganography and a barcode by decoding the encoded data by a decoding module of the security application;

determining whether the decoded data violates one or more security policies of a plurality of security policies of the network appliance by applying a Uniform Resource Locator (URL) filter to the decoded data by a content inspection engine of the security application; and when said determining whether the decoded data violates one or more security policies is affirmative, then protecting the intended recipient against the potentially malicious hidden data item by one or more of (i) blocking transmission of the media file to the intended recipient, (ii) causing the intended recipient to be alerted regarding the potentially malicious hidden data item and (iii) causing a network administrator of the protected network to be alerted regarding the potentially malicious hidden data item.

10. The network security appliance of claim 9, wherein said determining presence of a potentially malicious hidden data item comprises matching a signature of the media file against a plurality of signatures of media files known to include unsafe hidden data.

11. The network security appliance of claim 9, wherein the plurality of security policies includes a security policy containing information indicative of a URL known to be associated with malicious activities.

12. The network security appliance of claim 9, wherein the plurality of security policies includes a security policy containing information indicative of a URL associated with a blocked website.

13. The network security appliance of claim 9, wherein the plurality of security policies includes a security policy containing information indicative of a URL that redirects to a blocked website.

14. The network security appliance of claim 9, wherein the media file comprises an image file.

15. The network security appliance of claim 9, wherein the media file comprises video file.

16. The network security appliance of claim 9, wherein the barcode comprises a linear barcode or a matrix barcode.

* * * * *